US012311633B2

(12) United States Patent
Kim et al.

(10) Patent No.: US 12,311,633 B2
(45) Date of Patent: May 27, 2025

(54) CORRUGATING ROLLER HAVING ENHANCED HEAT TRANSFER EFFECTIVENESS

(71) Applicant: SRC CORPORATION, Gyeonggi-do (KR)

(72) Inventors: Kang Hyung Kim, Gyeonggi-do (KR); Hyung Keun Yoon, Seoul (KR); Hyung Jin Yoon, Gyeonggi-do (KR); Yun Ho Huh, Gyeonggi-do (KR); Geum Seok Yang, Gyeonggi-do (KR)

(73) Assignee: SRC CORPORATION, Gyeonggi-do (KR)

( * ) Notice: Subject to any disclaimer, the term of this patent is extended or adjusted under 35 U.S.C. 154(b) by 255 days.

(21) Appl. No.: 17/419,926

(22) PCT Filed: Jan. 15, 2019

(86) PCT No.: PCT/KR2019/000566
§ 371 (c)(1),
(2) Date: Jun. 30, 2021

(87) PCT Pub. No.: WO2020/149424
PCT Pub. Date: Jul. 23, 2020

(65) Prior Publication Data
US 2022/0080695 A1 Mar. 17, 2022

(51) Int. Cl.
*B31F 1/28* (2006.01)
*D21G 1/02* (2006.01)

(52) U.S. Cl.
CPC ......... *B31F 1/2863* (2013.01); *D21G 1/0266* (2013.01)

(58) Field of Classification Search
CPC .. D21G 1/0266; D21G 1/0253; D21G 1/0286; B31F 1/2863; B31F 1/285
See application file for complete search history.

(56) References Cited

U.S. PATENT DOCUMENTS 3,834,205 A * 9/1974 Maag ...................... B21B 27/08 72/241.4
4,917,664 A 4/1990 Lacaux
(Continued)

FOREIGN PATENT DOCUMENTS

CN 203919854 U 11/2014
CN 107297851 A * 10/2017
(Continued)

OTHER PUBLICATIONS

Written Opinion of International Application No. PCT/KR2109/000566 (Year: 2019).*
(Continued)

*Primary Examiner* — Christopher J. Besler
(74) *Attorney, Agent, or Firm* — The PL Law Group, PLLC

(57) ABSTRACT

A fluid circulation heating roller according to an embodiment of the present invention includes a roller body having a hollow cylindrical shape, a rotation shaft extending from each of opposite end portions of the roller body and disposed in the same center line, multiple first ducts extending in an axial direction in the roller body so as to heat the outer circumferential portion of the roller body, multiple second ducts extending in the axial direction on the outer circumferential portion of the roller body, wherein the number of second ducts are the same as the number of first ducts, and an insert inserted into at least one of the first or second ducts and extending in the axial direction. The generation of turbulence flow of fluid can be suppressed and laminar flow can be induced, whereby it is possible to maintain fluid-flowing speed and facilitate steam circulation and heat transfer.

6 Claims, 6 Drawing Sheets

(56) References Cited

U.S. PATENT DOCUMENTS

| | | | | |
|---|---|---|---|---|
| 5,725,466 | A * | 3/1998 | Eppli | D21G 1/0266 165/89 |
| 6,032,725 | A * | 3/2000 | Marschke | D21F 5/10 492/46 |
| 6,793,008 | B2 * | 9/2004 | von Schweinichen | F16C 13/00 492/46 |
| 2004/0132596 | A1 * | 7/2004 | Zaoralek | D21G 1/0266 427/366 |

FOREIGN PATENT DOCUMENTS

| | | | | |
|---|---|---|---|---|
| DE | 202013103958 | U1 * | 11/2013 | D21F 5/027 |
| KR | 10-2000-0012446 | A | 3/2000 | |
| WO | WO 00/45104 | A1 | 8/2000 | |

OTHER PUBLICATIONS

Machine Translation of DE 20 2013103958 U1 (Year: 2013).*
International Search Report for PCT/KR2019/000566 mailed on Oct. 14, 2019.

* cited by examiner

CORRUGATING ROLLER HAVING ENHANCED HEAT TRANSFER EFFECTIVENESS

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2019/000566, filed Jan. 15, 2019, the entire contents of which are incorporated herein by reference.

BACKGROUND

1. Technical Field

The present invention relates to a corrugating roller for shaping corrugated paperboard, more particularly to a corrugating roller that provides an enhanced heat transfer effectiveness for increased quality and productivity by using a fluid to heat the roller surface.

2. Description of the Related Art

Changes in the structure of industrial logistics and growth in the e-commerce market have led to a growth also in the packaging market. The corrugated paperboard, which uses waste paper as raw material, is inexpensive, easily recyclable, and lightweight, so that it has become an almost essential part of product packaging, with demands for the corrugated paperboard expected to continually increase. In step with such increases in demand, devices for efficiently producing high-quality corrugated paperboard are being developed.

In a facility for producing corrugated paperboard, the corrugating roller is a facility for shaping the corrugated paper in a fluted shape and corresponds to a core facility that determines the productivity and quality of the corrugated paperboard.

Here, the corrugating roller allows the corrugated paper to be shaped and maintained in the correct fluted shape, and in order to increase the adhesion between the corrugated paper and the liners provided by an adhesive, the roller may be heated to a particular temperature.

A conventional method of heating a corrugating roller may use a central heating structure, in which heated steam is supplied into a center part within the roller, but this may result in a decreased production speed, as this structure involves heating the entire roller and thus requires an extended duration of time for the initial heating. In addition, this structure involves applying heat from the inside of the main body, so that a large amount of thermal energy may be consumed, and if the rotation is halted due to the forming of condensation within the main body, the shape of the roller may be deformed, resulting in lower quality in the corrugated paperboard.

An invention conceived to resolve this problem is disclosed in Chinese Registered Utility Model No. 20-3919854 (published Nov. 5, 2014) entitled ‘Peripheral Heating Corrugated Roller’.

To resolve the problems in the related art associated with preheating time, energy loss, and production efficiency, the above discloses a corrugating roller that includes: a roller body including an inner chamber, steam inlet holes and steam outlet holes of the same number distributed along the circumference of the roller body, steam inlet holes and steam outlet holes arranged radially in the end portion of a first shaft, steam inlet holes and steam outlet holes arranged radially in the end portion of a second shaft, and a steam buffer groove formed on the end portion of the second shaft to connect the ends of the steam inlet holes with the ends of the steam outlet holes.

However, the ‘Peripheral Heating Corrugating Roller’ includes no mention of a difference in diameter between the steam inlet holes and steam outlet holes in the end portion of the first shaft, and during the process of the steam, which is a compressible fluid, entering from the steam inlet holes in the end portion of the first shaft into the steam inlet holes of a larger diameter formed in the roller body, the expansion effect at the widened channels may cause reductions in pressure and speed, thereby creating turbulence within the steam inlet holes and decreasing flow speed.

There is also the problem of condensation occurring during the heat transfer process, where a water layer may be formed within the steam inlet holes to rapidly lower the temperature of the roller and thus reduce the heat transfer effectiveness. Moreover, the temperature difference between the bearing at a first shaft-end where the steam enters and the bearing at a second shaft-end may cause an imbalance in the rotational motion of the roller, thereby creating a problem of roller vibration.

In particular, condensation occurring within the roller may incur a serious deformation of the roller when idle, leading to a lower quality of the corrugated paperboard. As such, there is a need for a technology that can enhance fluid-flowing speed and heat transfer efficiency while suppressing any imbalance in the roller resulting from condensation and temperature discrepancies.

SUMMARY

The present invention was conceived to resolve the problems above, and an objective of the present invention is to provide a fluid circulation heating roller that maintains the flow speed of the fluid and enhances the heat transfer effectiveness by having the direction of the channel bent by 90° while the cross section is enlarged, when the fluid flows from a fluid supply path to a first duct, so that the fluid which is a compressible gas may be suppressed from forming turbulence due to the expanded channel.

Another objective of the present invention is to provide a fluid circulation heating roller that can provide an enhanced heat transfer effectiveness while suppressing deformations in the roller caused by the condensation of the fluid, which is a compressible gas, during the heat transfer process of the roller.

Another objective of the present invention is to provide a fluid circulation heating roller that can reduce the temperature discrepancy between the bearing at the end portion of the shaft where the fluid enters and the bearing at the opposite end portion of the shaft.

Other objectives of the present invention will be more clearly understood from the preferred embodiments presented below.

One aspect of the present invention provides the following.

A fluid circulation heating roller is provided that includes: a roller body having a hollow cylindrical shape; rotary shafts extending from both end portions of the roller body to be formed coaxially; a multiple number of first ducts formed extending along an axial direction within the roller body so as to heat a perimeter portion of the roller body; a multiple number of second ducts that are formed extending along the axial direction in the perimeter portion of the roller body and are formed in the same number as the first ducts; and an insert inserted into at least one of the first ducts or second ducts to extend in the axial direction.

Here, the fluid circulation heating roller can be a rotary cylindrical roller that uses a fluid as a heat transfer medium such as a corrugating roller for shaping corrugated paperboard, a heating roller for heating sheets and fibers, etc.

In one embodiment, the fluid used as a heating medium of the fluid circulation heating roller can correspond to steam.

In one embodiment, the interior space of a first duct can be substantially separated by the insert to form a multiple number of fluid-flowing channels.

In one embodiment, the length by which the first duct extends along the axial direction can be substantially equal to the length by which the insert extends along the axial direction.

In one embodiment, the insert can be any one of a single linear ribbon, a multiple number of linear ribbons parallelly disposed, a multiple number of intersecting linear ribbons, a single ribbon twisted in a spiral shape, a multiple number of ribbons twisted in spiral shapes and parallelly disposed, a multiple number of intersecting ribbons twisted in spiral shapes, a single ribbon partially twisted in a spiral shape, a multiple number of ribbons partially twisted in spiral shapes and parallelly disposed, a multiple number of intersecting ribbons partially twisted in spiral shapes, a helical ribbon including a spiral ribbon attached to a wire core, and a wire twisted in a spiral shape.

Here, the ribbon refers to any element having the shape of an elongated strip and is not limited to a particular material.

In one embodiment, the form of the ribbon can be which one of a form having a folded portion on a side thereof, comprising a concave and a convex formed on a side portion thereof, and form comprising a hole and an indentation.

In one embodiment, the ribbon twisted in a spiral shape and the helical ribbon including the spiral ribbon attached to the wire core can have a slope of 30° or less.

Another aspect of the present invention provides a fluid circulation heating roller that includes: a roller body having a hollow cylindrical shape; rotary shafts extending from both end portions of the roller body to be formed coaxially; a multiple number of first ducts formed extending along an axial direction within the roller body so as to heat a perimeter portion of the roller body; a multiple number of second ducts formed extending along the axial direction in the perimeter portion of the roller body in the same number as the first ducts; and a laminar flow inducer formed within at least one of the first ducts or second ducts to generate a laminar flow in a compressible fluid.

In one embodiment, the fluid used as a heating medium of the fluid circulation heating roller can correspond to steam.

In one embodiment, the laminar flow inducer can have the form of a spiral groove processed into the inner side of the first duct or second duct.

In one embodiment, the fluid circulation heating roller can further include: a multiple number of supply channels and a multiple number of discharge channels extending in radius directions and arranged radially at a first end portion of the roller body; a multiple number of fluid circulation channels providing fluid-flowing channels between the first ducts and the second ducts corresponding to the first ducts arranged symmetrically at a second end portion of the roller body; a fluid supply line flowing through the rotary shaft adjacent to the first end portion of the roller body; and a fluid discharge line flowing through the rotary shaft adjacent to the first end portion of the roller body, where the first ducts and second ducts can be parallel to the central axis of the roller body and can be distributed along the circumference in the perimeter portion of the roller body.

In one embodiment, the supply channel can have one end connected with the fluid supply line and the other end connected with the first duct, the discharge channel can have one end connected with the fluid discharge line and the other end connected with the second duct, and the fluid circulation channel can have one end connected with the first duct and the other end connected with the second duct at a symmetrical position.

Another aspect of the present invention provides a fluid circulation heating roller that includes: a roller body having a hollow cylindrical shape; rotary shafts extending from both end portions of the roller body to be formed coaxially; a multiple number of first ducts formed extending along an axial direction within the roller body so as to heat a perimeter portion of the roller body; a multiple number of second ducts formed extending along the axial direction in the perimeter portion of the roller body in the same number as the first ducts; a multiple number of supply channels and a multiple number of discharge channels extending in radius directions and arranged radially at a first end portion of the roller body; a multiple number of fluid circulation channels providing fluid-flowing channels between the first ducts and the second ducts corresponding to the first ducts arranged symmetrically at a second end portion of the roller body; a fluid supply line flowing through the rotary shaft adjacent to the first end portion of the roller body; and a fluid discharge line flowing through the rotary shaft adjacent to the first end portion of the roller body, where the fluid circulation channels extend in radius directions and are arranged radially at the second end portion of the roller body, and each of the fluid circulation channels is formed with a slope such that, as the fluid circulation channel extends towards the rotary shaft from either end portion connected to the first duct or the second duct, the fluid circulation channel draws closer to a bearing of the rotary shaft adjacent to the second end portion, and the fluid circulation channels are formed in a sloped manner with symmetry about the rotary shaft.

Another aspect of the present invention provides a fluid circulation heating roller that includes: a roller body having a hollow cylindrical shape; rotary shafts extending from both end portions of the roller body to be formed coaxially; a multiple number of first ducts formed extending along an axial direction within the roller body so as to heat a perimeter portion of the roller body; a multiple number of second ducts formed extending along the axial direction in the perimeter portion of the roller body in the same number as the first ducts; a multiple number of supply channels and a multiple number of discharge channels extending in radius directions and arranged radially at a first end portion of the roller body; a multiple number of fluid circulation channels providing fluid-flowing channels between the first ducts and the second ducts corresponding to the first ducts arranged symmetrically at a second end portion of the roller body; a fluid supply line flowing through the rotary shaft adjacent to the first end portion of the roller body; and a fluid discharge line flowing through the rotary shaft adjacent to the first end portion of the roller body, where a diameter of the first ducts and a diameter of the supply channels are formed larger than a diameter of the discharge channels.

In one embodiment, a ratio of the diameter of the first ducts, the diameter of the supply channels and the diameter of the discharge channels can be within the range of (1.5~3):(1.15~2.0):1.

Another aspect of the present invention provides a fluid circulation heating roller that includes: a roller body having a hollow cylindrical shape; rotary shafts extending from both end portions of the roller body to be formed coaxially; a multiple number of first ducts formed extending along an axial direction within the roller body so as to heat a perimeter portion of the roller body; a multiple number of second ducts formed extending along the axial direction in the perimeter portion of the roller body in the same number as the first ducts; a multiple number of supply channels and a multiple number of discharge channels extending in radius directions and arranged radially at a first end portion of the roller body; a multiple number of fluid circulation channels providing fluid-flowing channels between the first ducts and the second ducts corresponding to the first ducts arranged symmetrically at a second end portion of the roller body; a fluid supply line flowing through the rotary shaft adjacent to the first end portion of the roller body; and a fluid discharge line flowing through the rotary shaft adjacent to the first end portion of the roller body, where the fluid-flowing speed in the discharge channels is higher than the fluid-flowing speed in the first ducts.

An embodiment of the present invention may include inserts which extend in the axial direction within the first ducts and/or second ducts to suppress turbulence in the fluid within the first ducts and/or second ducts that may otherwise occur due to the pressure and speed being reduced by the channel expansion effect in the course of the fluid entering the first ducts from the fluid supply channels or due to the rotational motion of the roller, so that a laminar flow can be formed for a smoother steam circulation and heat transfer. This utilizes the phenomenon that the flow of a fluid can be more easily made into a laminar flow at a flat plane compared to a circular pipe. Inserting a flat plane may provide an effect of forming a laminar flow, whereby turbulent flow may be suppressed in the ducts, and the flow speed of the fluid may be increased.

Also, if an insert is included that is twisted in a spiral shape, the fluid may be moved in a spiraling motion within the space, so that the gyroscopic effect can lower the Reynolds number and suppress the occurrence of turbulence, thereby somewhat increasing the flow speed at the central portion of the fluid.

According to an embodiment of the present invention, it is possible to control the ratio of the diameters of the first ducts, supply channels, and discharge channels so as to control the flow speed of the fluid and facilitate fluid circulation, thereby making it possible to prevent the forming of condensation while facilitating steam circulation and heat transfer.

According to an embodiment of the present invention, the fluid circulation channels can be made to have slopes that are symmetric about the center of the rotary shaft, so that the temperature difference between the bearings at both ends can be reduced, and deformations in the roller can be suppressed.

DETAILED DESCRIPTION

Figure 1:
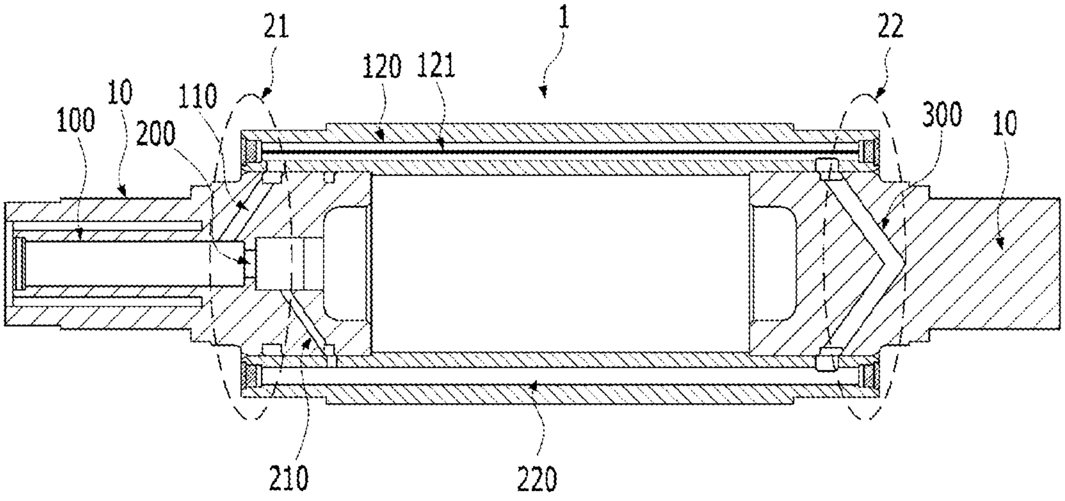
FIG. 1 is a cross-sectional view illustrating a fluid circulation heating roller based on the present invention.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed by the present invention. In the description of the present invention, certain detailed explanations of the related art are omitted if it is deemed that they may unnecessarily obscure the essence of the invention.

While such terms as "first" and "second," etc., can be used to describe various components, such components are not to be limited by the above terms. The above terms are used only to distinguish one component from another.

The terms used in the present specification are merely used to describe particular embodiments and are not intended to limit the present invention. An expression used in the singular encompasses the expression of the plural unless it has a clearly different meaning in the context. In the present specification, it is to be understood that terms such as "including" or "having," etc., are intended to indicate the existence of the features, numbers, steps, actions, components, parts, or combinations thereof disclosed in the specification and are not intended to preclude the possibility that one or more other features, numbers, steps, actions, components, parts, or combinations thereof may exist or may be added. Certain embodiments of the present invention will be described below in more detail with reference to the accompanying drawings.

Figure 2:
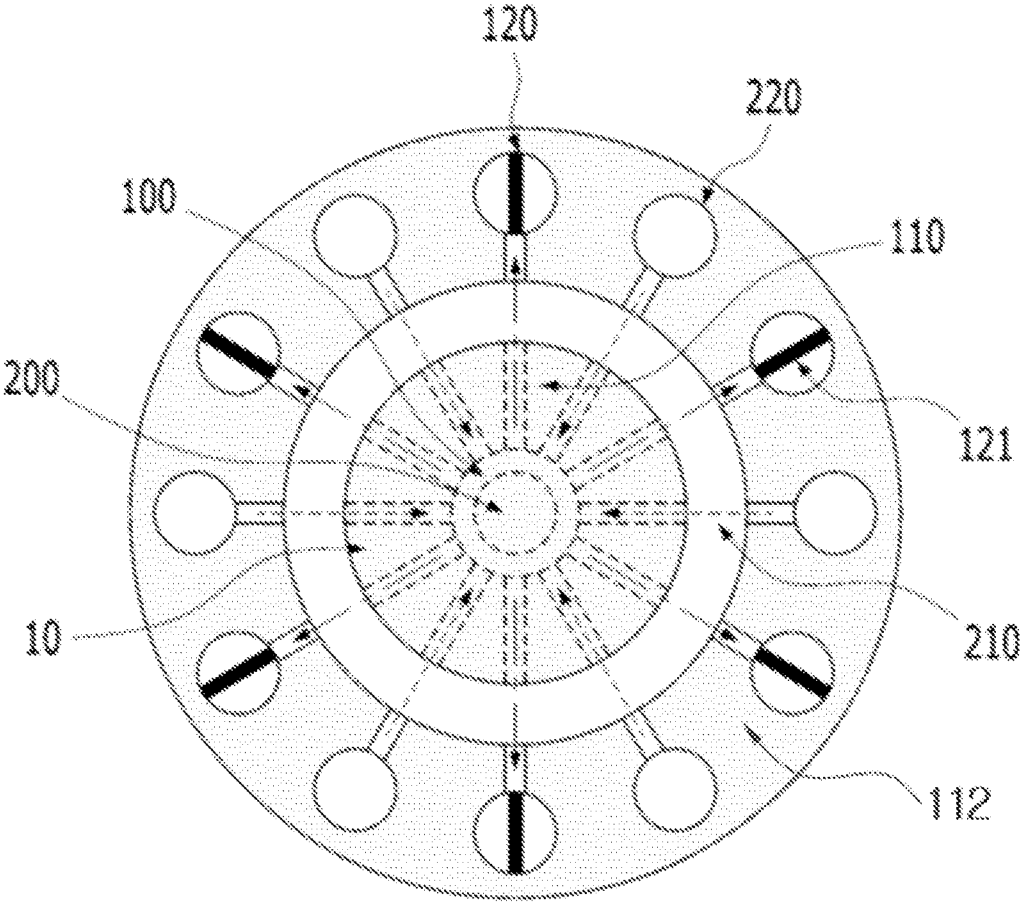
FIG. 2 is a cross-sectional view illustrating a first end portion of a fluid circulation heating roller based on the present invention.
Figure 3:
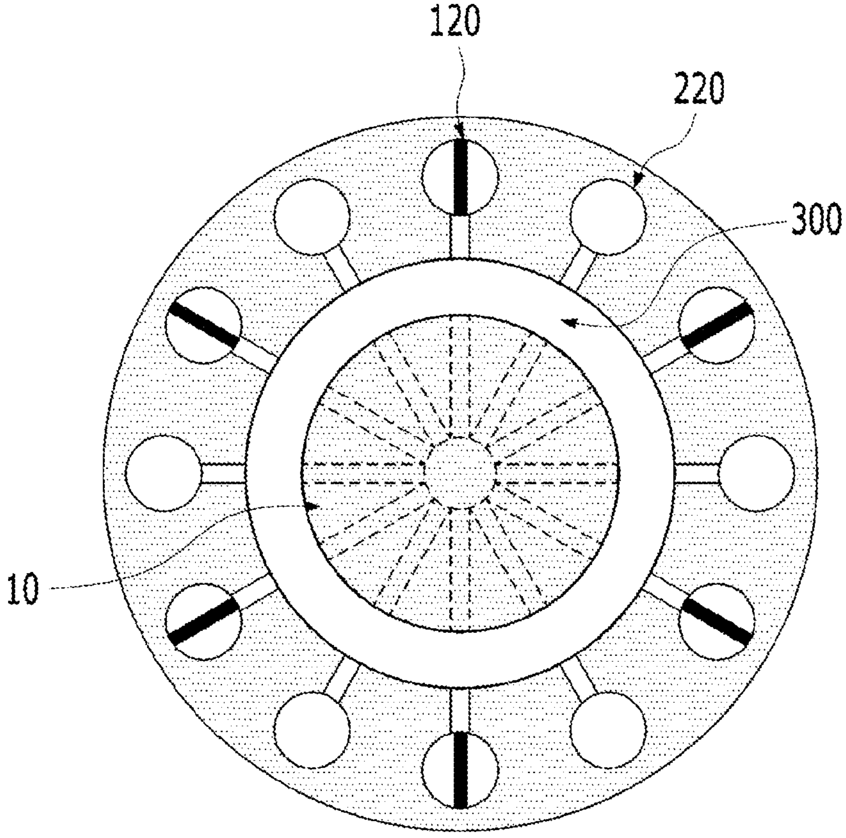
FIG. 3 is a cross-sectional view illustrating a second end portion of a fluid circulation heating roller based on the present invention.
Figure 4:
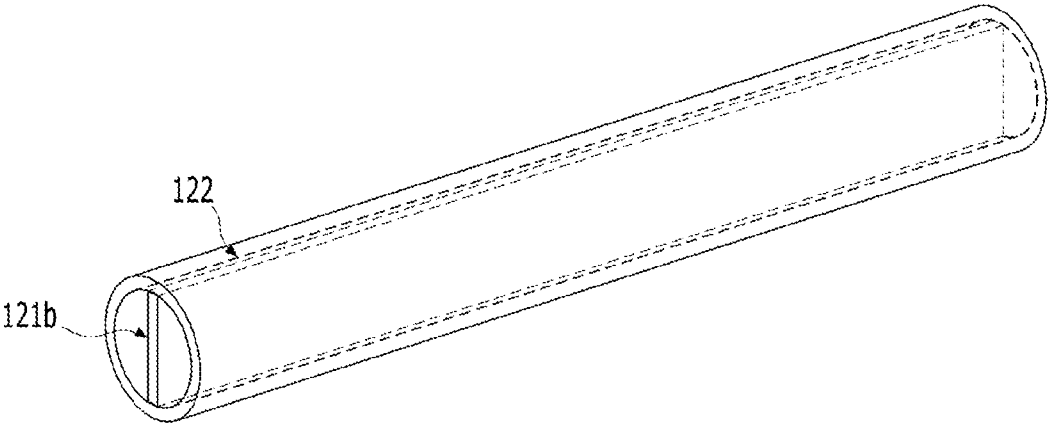
FIG. 4 is a perspective view illustrating a single linear ribbon insert within a first duct according to an embodiment of the present invention.
Figure 5:
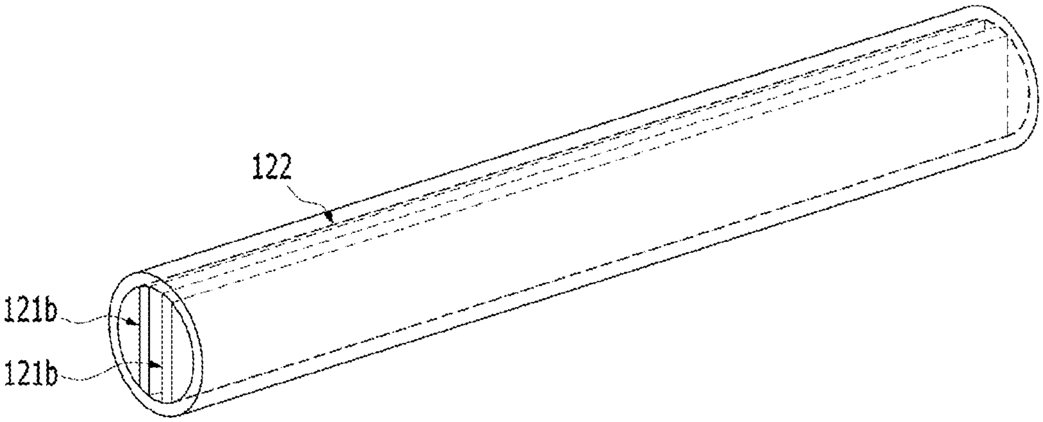
FIG. 5 is a perspective view illustrating multiple linear ribbon inserts within a first duct according to an embodiment of the present invention.
Figure 6:
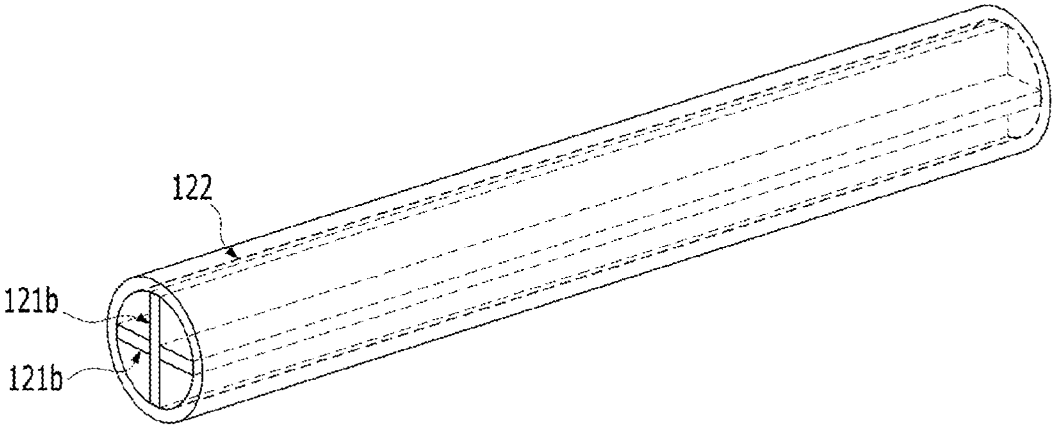
FIG. 6 is a perspective view illustrating multiple intersecting linear ribbon inserts within a first duct according to an embodiment of the present invention.
Figure 7:
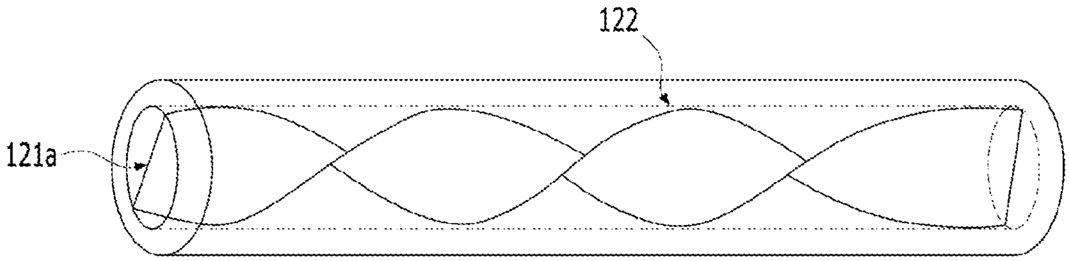
FIG. 7 is a perspective view illustrating a single ribbon insert twisted in a spiral shape within a first duct according to an embodiment of the present invention.
Figure 8:
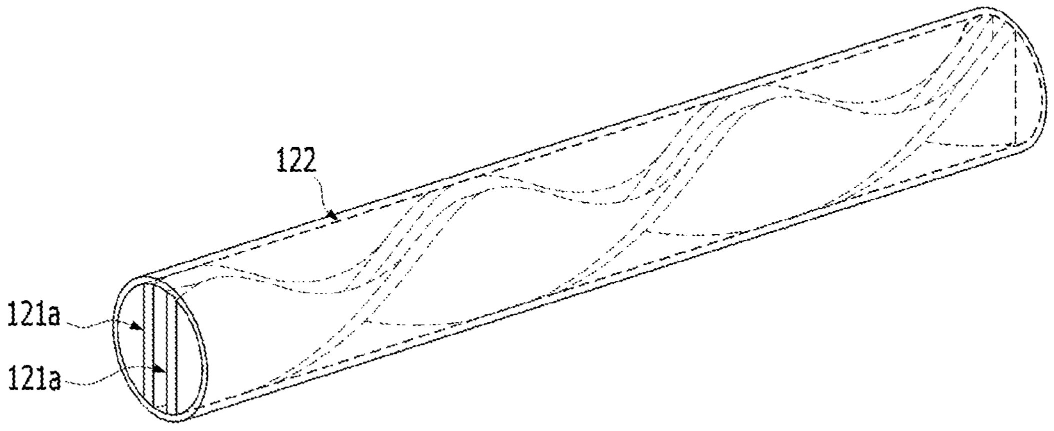
FIG. 8 is a perspective view illustrating multiple ribbon inserts twisted in spiral shapes within a first duct according to an embodiment of the present invention.
Figure 9:
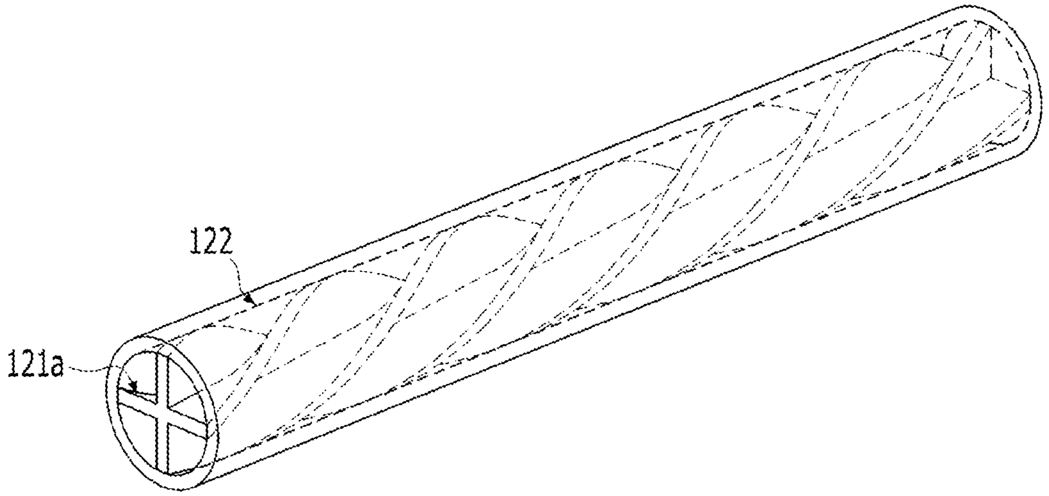
FIG. 9 is a perspective view illustrating multiple intersecting ribbon inserts twisted in spiral shapes within a first duct according to an embodiment of the present invention.
Figure 10:
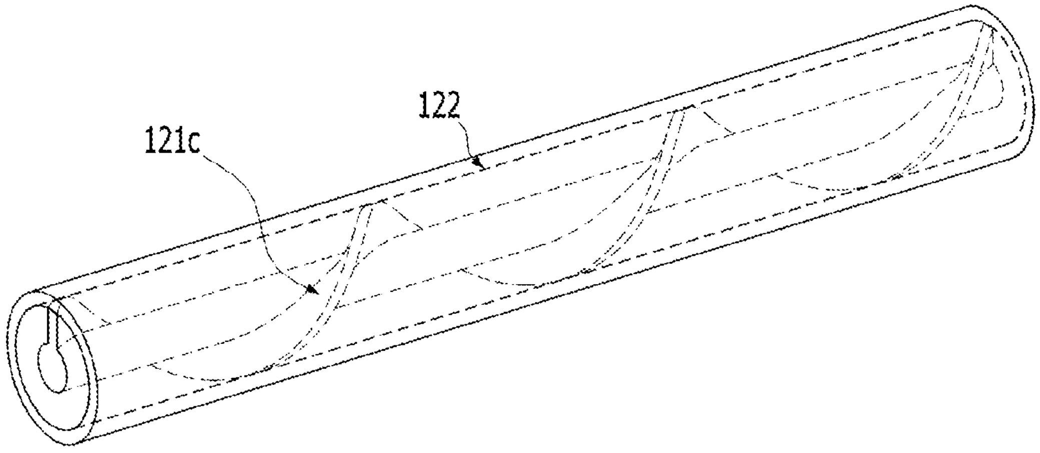
FIG. 10 is a perspective view illustrating a helical ribbon insert that includes a spiral ribbon attached to a wire core within a first duct according to an embodiment of the present invention.

FIG. 1 is a cross-sectional view illustrating a fluid circulation heating roller based on the present invention; FIG. 2 and FIG. 3 are cross-sectional views illustrating a first end portion and a second end portion of a fluid circulation heating roller based on the present invention; FIG. 4, FIG. 5, and FIG. 6 are perspective views illustrating a single linear ribbon insert, multiple linear ribbon inserts, and multiple intersecting linear ribbon inserts within a first duct according to an embodiment of the present invention; FIG. 7, FIG. 8, and FIG. 9 are perspective views illustrating a single ribbon insert twisted in a spiral shape, multiple ribbon inserts twisted in spiral shapes, and multiple intersecting ribbon inserts twisted in spiral shapes within a first duct according to an embodiment of the present invention; and FIG. 10 is a perspective view illustrating a helical ribbon insert that includes a spiral ribbon attached to a wire core within a first duct according to an embodiment of the present invention.

The corrugating roller having an enhanced heat transfer effectiveness according to the present invention was conceived to provide a quicker and more efficient heating structure as well as to resolve the problems in the heating structure of the conventional corrugating roller associated with lowered heat transfer efficiency and deformations in the roller resulting from a decrease in the flow speed of the fluid and the occurrence condensation.

These functions and effectiveness provided by the present invention can be achieved as parts of the steam circulation circuit that connect with one another in an organic manner within the roller are readily processed without difficulty structurally and are arranged in an optimized form and structure that minimize the occurrence of condensation and induce a smooth circulation of steam.

Referring to FIG. 1, a fluid circulation heating roller may include, among others, a roller body 1, rotary shafts 10, a multiple number of first ducts 120, and a multiple number of second duct 220.

Here, the fluid circulation heating roller may use a compressible fluid as the heating medium, where steam can generally be used for the heating medium.

As the roller body 1 will have steam HS of a high temperature and high pressure circulated within, the roller body 1 can be fabricated from a Cr—Mo alloy steel subjected to a hardening/tempering procedure to provide a tensile strength of 650 MPa or higher and a yield strength of 450 MPa or higher according to the standards of the ASME (American Society of Mechanical Engineers) or the PED (Pressure Equipment Directive) of the EU or SCM440 (AISI 4140), which provides a tensile strength of 980 MPa or higher and a yield strength of 630 MPa or higher, or another steel type that provides similar strength and ductility properties, so that the necessary safety requirements may be satisfied.

The steel types having the properties described above can be selected as necessary, since these have specific heat properties within the range of 0.473 to 0.486 J/g·° C. and thus do not greatly differ from one another in the context of steam circulation.

The rotary shafts 10 may be formed coaxially, extending from the first end portion 21 and second end portion 22 of the roller body 1, which may have a cylindrical shape of a particular length. The first ducts 120 and second ducts 220 may be formed in the same number in the roller body 1.

The first ducts 120 and second ducts 220 may be components shaped as through-holes that allow the high-temperature high-pressure steam HS, which may be provided from the exterior, to flow along the lengthwise direction immediately below the surface of the roller body 1 to apply heat directly to the roller body 1. The first ducts 120 and second ducts 220 may thus be formed in the roller body 1 as parts of a steam circulation circuit. Referring to FIGS. 1 to 3, the multiple numbers of first ducts 120 and second ducts 220 can be formed flowing through the lengthwise direction of the roller body 1 while arranged separately from one another along the thickness portion adjacent to the surface of the roller body 1.

Here, in a corrugated paperboard production facility, a lower main corrugating roller having a roller body 1 of a 500 mm diameter can have about twenty to thirty first ducts 120 and second ducts 220 formed in equal intervals along the thickness portion of the roller body 1, while a subsidiary corrugating roller having a roller body 1 of a 330 mm diameter with a smaller surface area can have about ten to twenty first ducts 120 and second ducts 220 formed in equal intervals. The first ducts 120 and second ducts 220 can be made with diameters of about 15 mm~30 mm by way of drill processing.

Referring to FIG. 2 and FIG. 3, the first ducts 120 and second ducts 220 thus formed in even numbers and arranged along the thickness portion of the roller body 1 can be arranged alternatingly along the thickness portion of the cylindrical body 112. That is, the first ducts 120 and second ducts 220 can be formed in the same number and can be arranged alternatingly to be adjacent to each other.

Such alternating arrangement of the first ducts 120 and second ducts 220 can distribute the possible occurrence of condensation over each of the first ducts 120 and second ducts 220 having narrow surface areas such that the occurrence of condensation is not concentrated on any one point, thereby minimizing the occurrence of condensation and fundamentally preventing roller deformation, and can also provide a quick and uniform heating of the entire roller body 1.

Here, a first duct 120 may be a component of the steam circulation circuit through which the high-temperature steam HS introduced from the exterior may immediately flow to directly heat the roller body 1. The first duct 120 can be connected in a one-to-one relationship with a supply channel 110, which is described later on, to receive the high-temperature steam HS.

A second duct 220 may be a component of the steam circulation circuit through which the steam LS that has been cooled after flowing through the first duct 120 described above and heating the roller body 1 may be discharged to the exterior. The second duct 220 can be connected in a one-to-one relationship with a discharge channel 210, which is described later on, to discharge the cooled steam LS to the exterior.

In one embodiment, the fluid circulation heating roller can include an insert 121, which may be inserted inside either of the first duct 120 or second duct 220 or inside both the first duct 120 and the second duct 220 to extend along the axial direction within the hole.

Here, the fluid used as the heating medium of the fluid circulation heating roller can be steam, and the insert 121 can further be inserted into at least one of a supply channel 110, a discharge channel 210, and a fluid circulation channel 300, selectively.

The length in the axial direction of at least one of the first ducts 120 or second ducts 220 can be formed substantially the same as the length in the axial direction of the insert 121, and at least one of the interior space of the first duct 120 or the interior space of the second duct 220 can be substantially separated by the insert 121 to form a multiple number of fluid-flowing channels. Here, reference to a space being 'substantially separated' may mean that the interior space is completely separated by the insert 121 or that the interior space is separated to the extent that turbulence is suppressed by the insert 121 within the interior space.

In the first duct 120, the insert 121 may suppress the occurrence of turbulence caused by the rotation of the roller body 1 or by the effect of an increase in the cross section of the channel on a fluid that is a compressible gas when the fluid flows from the supply channel 110 to the first duct 120, so as to generate a laminar flow and thereby maintain the flow speed of the fluid and facilitate the heat transfer. In the second duct 220, the insert 121 may suppress the occurrence of turbulence caused by the rotation of the roller body 1 or by the effect of an increase in the cross section of the channel on a fluid that is a compressible gas when the fluid moves from the fluid circulation channel 300 to the second duct 220, so as to generate a laminar flow and thereby maintain the flow speed of the fluid and facilitate the heat transfer.

Referring to FIGS. 4 to 10, the insert 121 can be any one of a single linear ribbon 121*b*, a multiple number of linear ribbons parallelly disposed 121*b*, a multiple number of intersecting linear ribbons 121*b*, a single ribbon 121*a* twisted in a spiral shape, a multiple number of ribbons 121*a* twisted in spiral shapes and parallelly disposed, a multiple number of intersecting ribbons 121*a* twisted in spiral shapes, a single ribbon partially twisted in a spiral shape, a multiple number of ribbons partially twisted in spiral shapes and parallelly disposed, a multiple number of intersecting ribbons partially twisted in spiral shapes, a helical ribbon 121*c* having a spiral ribbon attached to a wire core, and a wire twisted in a spiral shape. Here, the ribbon can include one of a form having a folded portion on a side there of, a form having a concave and a convex formed on a side portion thereof, and a form having a hole and indentation, or the like.

In cases where a ribbon 121*a* twisted in a spiral shape, a wire twisted in a spiral shape, and a helical ribbon 121*c* having a spiral ribbon attached to a wire core is inserted, a spiraling motion may be induced in the fluid, and the gyroscopic effect may lower the Reynolds number, effectively suppressing the occurrence of turbulence and somewhat increasing the flow speed of the central portion of the fluid.

A ribbon 121*a* twisted in a spiral shape and a helical ribbon 121*c* composed of a wire and a spiral ribbon attached to the wire core can have a slope of 30° or less, as an angle greater than 30° can result in an excessive slowing of the flow speed of the compressible fluid, which in turn can promote the forming of condensation. Essentially, the ribbon 121*a* twisted in a spiral shape and the helical ribbon 121*c* composed of a wire and a spiral ribbon attached to the wire core can have a slope of 20° or less, which can maintain a high flow speed of the fluid and thus facilitate steam circulation and heat transfer.

In another embodiment, the fluid circulation heating roller can include a laminar flow inducer, which may be formed inside any one of the first ducts 120 or second ducts 220 or inside both the first ducts 120 and second ducts 220, to generate a laminar flow for the compressible fluid.

Here, steam can be used for the compressible fluid used as the heating medium for the fluid circulation heating roller, and the laminar flow inducer can further be formed in at least one of the supply channels 110, discharge channels 210, and fluid circulation channels 300, selectively.

For example, a laminar flow inducer formed in a first duct 120 may reduce the flow velocity of the fluid contacting the inner wall and increase pressure to increase the flow velocity at the central portion, thereby suppressing turbulence, which may occur in a fluid that is a compressible gas as the cross section of the channel is increased when the fluid moves from the supply channel 110 to the first duct 120, inducing a laminar low, and facilitating heat transfer. A laminar flow inducer formed in a second duct 220 may reduce the flow velocity of the fluid contacting the inner wall and increase pressure to increase the flow velocity at the central portion, thereby suppressing turbulence, which may occur in a fluid that is a compressible gas as the cross section of the channel is increased when the fluid moves from the fluid circulation channel 300 to the second duct 220, inducing a laminar low, and facilitating heat transfer.

The laminar flow inducer can be in the form of a spiral groove processed into an inner side of the first duct or second duct, where the spiral groove can be any of a variety of shapes such as a quadrilateral groove, a triangular groove, a U-shaped groove, etc.

In one embodiment, referring to FIG. 1, the fluid circulation heating roller can further include a multiple number of supply channels 110 and a multiple number of discharge channels 210, a multiple number of fluid circulation channels 300, a fluid supply line 100, and a fluid discharge line 200, where the first ducts 120 and the second ducts 220 can be parallel to the central axis of the roller body 1 and can be distributed along the circumference in the perimeter portion of the roller body 1.

Here, the fluid supply line 100, supply channels 110, first ducts 120, fluid discharge line 200, discharge channels 210, second ducts 220, fluid circulation channels 300, etc., may be organically connected to one another within the roller body 1 as a network of piping forming a single integrated steam circulation circuit, by which steam may apply heat to the surface of the roller body 1 while being circulated continuously.

Here, the fluid supply line 100, which may pass the rotary shaft adjacent to the first end portion 21, may be a component that provides steam generated by a heating means such as a boiler, etc. Also, the fluid discharge line 200, which may pass the rotary shaft adjacent to the first end portion, may be a component arranged in a structure clearly partitioned from the fluid supply line 100 and configured to discharge the steam to the exterior.

The fluid supply line 100 and fluid discharge line 200 may be components shaped as a dual pipe that on the one hand provides the high-temperature high-pressure steam HS from the exterior to the supply channels 110 described above and on the other hand discharges the lowered-temperature and lowered-pressure steam LS, which has been used in heating the surface of the roller body 1, to the exterior after it is received from the discharge channels 210. The fluid supply line 100 and fluid discharge line 200 may be formed along the rotary shaft RX at the first end portion 21 to form a part of the steam circulation circuit.

For example, the high-temperature high-pressure steam HS heated by a heating means such as an external boiler, etc., can be flowed through a fluid supply line 100 that is partitioned in a sealed state and arranged at the outer periphery, and the steam LS having the lowered temperature can be retrieved and discharged through a fluid discharge line 200 that is surrounded by the high-temperature steam. This structure can heat the surface of the roller body 1 both quickly and to a high temperature by supplying the high-temperature steam HS to the first ducts 120 via a fluid supply line 100 that is positioned adjacent to the surface of the roller body 1, so that the shortened path can minimize heat loss and allow a quick supply of the high-temperature steam HS. Also, by facilitating steam circulation to minimize the occurrence of condensation and maintaining the circulation speed of the steam, it is possible not only to facilitate the discharge of the steam but also to effectively reduce the rate of temperature decrease in the steam immediately before the steam is discharged to the exterior, so that the discharged steam can be flowed to and reused in another roller for maximum thermal efficiency.

The supply channels 110 may be components shaped as through-holes that connect with the first ducts 120 arranged along the thickness portion of the roller body 1 to provide the high-temperature steam HS to the first ducts 120, and the discharge channels 210 may be components shaped as through-holes that connect with the second ducts 220 arranged along the thickness portion of the roller body 1 to mediate the retrieval and discharge of the lowered-temperature steam LS by retrieving the steam LS, which has been lowered in temperature after heating the roller body 1, from the second ducts 220 and discharging the steam LS to the exterior.

Referring to FIGS. 3 and 4, these supply channels 110 and discharge channels 210 can be formed radially, flowing through the radius directions of the roller body 1 without intersecting one another and separated from one another at the first end portion 21, to form parts of a steam circulation circuit. The supply channels 110 may be formed with larger diameters compared to the discharge channels 210 to facilitate steam circulation.

Here, the supply channels 110 can be formed by drill processing to diameters of about 10 mm~20 mm, and the discharge channel 210 can be formed by drill processing to diameters of about 8 mm~16 mm.

In the embodiment above, a multiple number of fluid circulation channels 300 can be arranged radially and extending in radius directions at the second end portion 22 of the roller body 1 such that the first ducts 120 and second ducts 220 at positions corresponding to each other are connected at the second end portion 22.

In the embodiment above, one end of each supply channel 110 adjacent to the central axis of the roller body 1 may be connected with the fluid supply line 100, while the other end adjacent to the surface of the roller body 1 may be connected with a first duct 120, whereby the supply channel 110 can provide the high-temperature steam HS, supplied from the fluid supply line 100, to the first duct 120.

Also, in the embodiment above, one end of each discharge channel 210 adjacent to the central axis of the roller body 1 may be connected with the fluid discharge line 200 and the extended rotary joint (not shown), while the other end adjacent to the surface of the roller body 1 may be connected with a second duct 220, whereby the discharge channel 210 can retrieve the lowered-temperature steam LS, which has been lowered in temperature after heating the roller body 1, from the second duct 220 and discharge the steam to the exterior of the roller.

Referring to FIG. 1, a fluid circulation heating roller in another embodiment may include a roller body 1, rotary shafts 10, a multiple number of first ducts 120, a multiple number of second ducts 220, multiple numbers of supply channels 110 and discharge channels 210, a multiple number of fluid circulation channels 300, a fluid supply line 100, and a fluid discharge line 200. Here, the multiple fluid circulation channels 300 may be arranged radially extending in radius directions at the second end portion 22 of the roller body 1 such that the first ducts 120 and second ducts 220 at positions corresponding to each other are connected at the second end portion 22. Also, each fluid circulation channel 300 may be formed with a slope such that, as the fluid circulation channel 300 extends towards the rotary shaft 10 from either end portion, which may be connected to a first duct 120 or a second duct 220, the fluid circulation channel 300 draws closer to the bearing of the rotary shaft 10 adjacent to the second end portion 22. The fluid circulation channel 300 may thus be formed in a sloped manner with symmetry about the rotary shaft 10.

As the fluid circulation channels 300 are thus sloped with symmetry about the rotary shaft 10 at the second end portion 22, the temperature difference between the first end portion 21 and the second end portion 22 as well as the weight difference between the left and right sides of the roller body 1 can be reduced, allowing the bearings on both sides to operate more smoothly and enhancing the durability of the bearings.

Referring to FIG. 1, in a fluid circulation heating roller according to an embodiment of the present invention described above, steam may be circulated repeatedly through the fluid circulation path described below to quickly heat the surface of the roller body 1.

A fluid having a high temperature and high pressure generated by an external means such as a boiler, etc., may sequentially pass through the fluid supply line 100 and the supply channels 110 to be provided radially to each of the first ducts 120 concurrently.

Next, the steam that has concurrently flowed through the multiple first ducts 120, which may be arranged in-between the second ducts 220, to heat the surface of the roller body 1 may then, in a state of lowered temperature and lowered pressure, be flowed into the second ducts 220, which may be arranged in-between the first ducts 120, to flow in the retrieval direction.

Lastly, the steam that has flowed in the retrieval direction along the second ducts 220 may converge radially through the discharge channels 210 to flow through the steam discharge line 200 and be discharged to the exterior.

In a fluid circulation heating roller based on another embodiment, the diameters of the first ducts 120, the diameters of the second ducts 220, and the diameters of the supply channels 110 may be formed larger than the diameters of the discharge channels 210. Essentially, the first ducts 120 and the second ducts 220, the supply channels 110, and the discharge channels 210 can have increasingly smaller diameters in said order.

In one embodiment, the ratio of diameters of the first ducts 120 and second ducts 220, the supply channels 110, and the discharge channels 210 can essentially be within the range of (1.5~3):(1.15~2.0):1.

Here, a reason for forming the first ducts 120 and second ducts 220 with the larger diameters is so that the steam may contact the roller body 1 over a wide an area as possible, within a range that does not promote condensation, to smoothly perform the functions of heat transfer and temperature regulation. Also, a reason for forming the discharge channels 210 to have diameters that are smaller compared to the supply channels 110, through which the compressible fluid in a highly pressurized state flows, is so that the flow speed of the fluid may be increased in the discharge channels 210, thereby allowing the steam having a reduced pressure and reduced speed due to the heat loss in the first ducts 120 and second ducts 220 to flow more smoothly. Thus, the steam can be smoothly discharged through the discharge channel 210 without congestion, and the occurrence of condensation can be reduced as well.

The reasons for forming the first ducts 120 and second ducts 220, as well as the supply channels 110 and discharge channels 210 connected therewith, in a number proportional to the diameter of the roller body 1 of the fluid circulation heating roller and proposing that the ratio of the diameter A of the first ducts 120 and second ducts 220, the diameter B of the supply channels 110, and the diameter C of the discharge channels 210 be set as (1.5~3):(1.15~2.0):1 as mentioned above are as follows.

Firstly, from among the diameter proportions listed above, if the diameter A of the first ducts 120 and second ducts 220 is less than 1.5 times the diameter C of the discharge channels 210, the flow speed of the steam may be too fast, so that there would be insufficient time for heat transfer from the steam to the roller body 1, and if the diameter A is more than 3 times the diameter C of the discharge channels 210, the excessive heat transfer of steam flowing through the first ducts 120 and second ducts 220 may cause an excessive amount of wet steam, which may form condensation and inhibit the discharge of the steam.

These problems can be easily understood from Table 1 and Table 2, which list the conditions for Comparative Examples 1 and 2 at the initial phases of steam circulation, where the large differences in temperature and pressure provide a clear distinction between the supply channels 110 and the discharge channels 210.

Thus, for a fixed diameter C of the discharge channels 210, the ratio of the diameter A of the first ducts 120 and second ducts 220 may be limited to a value within the range of 1.5~3, as described above.

TABLE 1

| | Comparative Example 1 | | | |
|---|---|---|---|---|
| | Diameter (mm, relative ratio) | Number | Temperature (° C.) | Pressure (kgf/cm$^3$) |
| A | 20 | 12 | 141 | 2.7 |
| B | 14 | 6 | 187 | 10.9 |
| C | 14 | 6 | 170 | 7.0 |
| B/C | 1.0 | — | — | — |
| A/C | 1.4 | — | — | — |

TABLE 2

| | Comparative Example 2 | | | |
|---|---|---|---|---|
| | Diameter (mm, relative ratio) | Number | Temperature (° C.) | Pressure (kgf/cm$^3$) |
| A | 20 | 26 | 137 | 2.4 |
| B | 14 | 13 | 187 | 10.9 |
| C | 14 | 13 | 168 | 6.7 |
| B/C | 1.0 | — | — | — |
| A/C | 1.4 | — | — | — |

Secondly, from among the diameter proportions listed above, if the diameter B of the supply channels 110 is less than 1.15 times the diameter of the discharge channels 210, the pressure of the steam flowing through the discharge channels 210 may be decreased, which in turn may decrease the steam pressure within the first ducts 120 and second ducts 220 also, thus promoting and forming of condensation and inhibiting steam circulation.

Also, if the diameter B of the supply channels 110 is more than twice the diameter of the discharge channels 210, the flowed steam may experience flow resistance when entering the discharge channels 210, i.e., congestion may occur, so that the steam may not be circulated smoothly.

These problems can also be easily understood from the large differences in temperature and pressure between the supply channels 110 and the discharge channels 210 in Table 1 and Table 2, which list the conditions for Comparative Examples 1 and 2.

Thus, for a fixed diameter C of the discharge channels 210, the ratio of the diameter B of the supply channels 110 may be limited to a value within the range of 1.15~2, as described above.

TABLE 3

| | Optimal Example 1 | | | |
|---|---|---|---|---|
| | Diameter (mm, relative ratio) | Number | Temperature (° C.) | Pressure (kgf/cm$^3$) |
| A | 22.5 | 16 | 145 | 3.2 |
| B | 16 | 8 | 187 | 10.9 |
| C | 12 | 8 | 180 | 9.2 |
| B/C | 1.3 | — | — | — |
| A/C | 1.9 | — | — | — |

TABLE 4

| | Optimal Example 2 | | | |
|---|---|---|---|---|
| | Diameter (mm, relative ratio) | Number | Temperature (° C.) | Pressure (kgf/cm$^3$) |
| A | 20 | 16 | 147 | 3.3 |
| B | 16 | 8 | 187 | 10.9 |
| C | 10 | 8 | 185 | 10.4 |
| B/C | 1.6 | — | — | — |
| A/C | 2.0 | — | — | — |

Thirdly and lastly, as presented in Table 3 and Table 4, which list the conditions for Optimal Examples 1 and 2, forming the ratio of the diameter A of the first ducts 120 and second ducts 220, the diameter B of the supply channels 110, and the diameter C of the discharge channels 210 to be (1.5~3):(1.15~2.0):1 can provide the following desirable effects.

That is, the supplied high-temperature steam HS can be smoothly circulated within and discharged from the steam circulation circuit of the present invention without congestion from the supply channels 110 to the discharge channels 210, the occurrence of condensation can be minimized so that deformations in the fluid circulation heating roller can be reduced as well, and the surface of the roller body 1 can be heated in a quick and efficient manner.

These effects can be easily understood from the small differences in temperature and pressure between the supply channels 110 and discharge channels 210 presented in Table 3 and Table 4.

While the foregoing illustrates and describes preferred embodiments of the present invention, the present invention is not limited to the specific embodiments described above. It should be appreciated that numerous variations can be derived by the person having ordinary skill in the field of art to which the present invention pertains without departing from the essence of the present invention as defined in the scope of claims and that such variations are not to be understood separately from the technical spirit or prospects of the present invention.

The preferred embodiments of the present invention provided above are disclosed for illustrative purposes only. It should be appreciated that the skilled person having ordinary skill in regard to the present invention would be able to make various modifications, alterations, and additions without departing from the spirit and scope of the present invention and that such modifications, alterations, and additions are encompassed within the scope of claims below.

What is claimed is:

1. A fluid circulation heated corrugating roller comprising:

a roller body having a hollow cylindrical shape, the roller body having a first end portion and a second end portion opposing to the first end portion;

rotary shafts extending from the first end portion and the second end portion of the roller body to be formed coaxially;

a plurality of first ducts formed extending along an axial direction within the roller body so as to heat a perimeter portion of the roller body;

a plurality of second ducts formed extending along the axial direction in the perimeter portion of the roller body, the second ducts formed in a same number as the first ducts;

a compressible fluid configured to be used as a heating medium of the fluid circulation heating roller; and a spiral laminar flow inducer formed within at least one of the first ducts or second ducts to generate a spiral laminar flow in the compressible fluid within the at least one of the first ducts or second ducts by reducing Reynolds number to suppress an occurrence of turbulence, wherein one of the rotary shafts comprises a plurality of supply channels and a plurality of discharge channels extending in a radial direction of the roller and arranged radially adjacent to the first end portion of the roller body, wherein a ratio of a diameter of the first ducts and second ducts, a diameter of the supply channels and a diameter of the discharge channels is within a range of (1.5-3):(1.15-2.0):1, wherein the compressible fluid is steam, wherein the spiral laminar flow inducer is an insert inserted into at least one of the first ducts or second ducts to extend in the axial direction, wherein the insert comprises any one of a single ribbon twisted in a spiral shape, a plurality of ribbons twisted in spiral shapes and parallelly disposed, a plurality of intersecting ribbons twisted in spiral shapes, a single ribbon partially twisted in a spiral shape, a plurality of ribbons partially twisted in spiral shapes and parallelly disposed, a plurality of intersecting ribbons partially twisted in spiral shapes, a helical ribbon comprising a spiral ribbon attached to a wire core, and a wire twisted in a spiral shape, wherein the ribbon twisted in a spiral shape and the helical ribbon comprising the spiral ribbon attached to the wire core have a slope of 30° or less.

2. The fluid circulation heating roller of claim 1, further comprising:

a plurality of supply channels and a plurality of discharge channels extending in radius directions and arranged radially at the first end portion of the roller body;

a plurality of fluid circulation channels providing fluid-flowing channels between the first ducts and the second ducts corresponding to the first ducts arranged symmetrically at the second end portion of the roller body;

a fluid supply line passing through a rotary shaft of the rotary shafts that is adjacent to the first end portion of the roller body; and a fluid discharge line passing through the rotary shaft adjacent to the first end portion of the roller body, wherein the first ducts and second ducts are parallel to a central axis of the roller body and distributed along a circumference in the perimeter portion of the roller body.

3. The fluid circulation heating roller of claim 2, wherein each of the plurality of supply channels has a first end thereof connected with the fluid supply line and a second end thereof connected with the first duct;

each of the plurality of discharge channels has a first end thereof connected with the fluid discharge line and a second end thereof connected with the second duct; and the fluid circulation channel has a first end thereof connected with the first duct and a second end thereof connected with the second duct at a symmetrical position.

4. The fluid circulation heating roller of claim 1, wherein an interior space of at least one of the first ducts or second ducts is substantially separated by the insert to form a plurality of fluid-flowing channels.

5. The fluid circulation heating roller of claim 1, wherein a length of at least one of the first ducts or second ducts along the axial direction is substantially equal to a length of the insert along the axial direction.

6. The fluid circulation heating roller of claim 1, wherein the insert comprises any one of a single ribbon twisted in a spiral shape, a plurality of ribbons twisted in spiral shapes and parallelly disposed, a plurality of intersecting ribbons twisted in spiral shapes, a single ribbon partially twisted in a spiral shape, a plurality of ribbons partially twisted in spiral shapes and parallelly disposed, and a plurality of intersecting ribbons partially twisted in spiral shapes, and a twisted form of the single ribbon twisted in the spiral shape, the plurality of ribbons twisted in the spiral shapes, the plurality of intersecting ribbons twisted in the spiral shapes, the single ribbon partially twisted in the spiral shape, the plurality of ribbons partially twisted in the spiral shapes, and the plurality of intersecting ribbons partially twisted in the spiral shapes is any one of a form having a folded portion on a side thereof, a form comprising a concave and a convex formed in a side portion thereof, and a form comprising a hole and an indentation.

* * * * *